Dec. 7, 1948.   W. A. TRAUT   2,455,626
MECHANICAL MOVEMENT FOR CONVERTING ROTARY
MOTION INTO RECIPROCATING MOVEMENT
Filed June 24, 1944   4 Sheets-Sheet 1

INVENTOR.
W. A. Traut
BY
Lieber & Lieber
ATTORNEYS.

Dec. 7, 1948.  W. A. TRAUT  2,455,626
MECHANICAL MOVEMENT FOR CONVERTING ROTARY
MOTION INTO RECIPROCATING MOVEMENT
Filed June 24, 1944  4 Sheets-Sheet 3

INVENTOR.
W. A. Traut
BY
Lieber & Lieber
ATTORNEYS.

Dec. 7, 1948.  W. A. TRAUT  2,455,626
MECHANICAL MOVEMENT FOR CONVERTING ROTARY
MOTION INTO RECIPROCATING MOVEMENT
Filed June 24, 1944  4 Sheets-Sheet 4

INVENTOR.
W. A. Traut
BY
Lieber & Lieber
ATTORNEYS

Patented Dec. 7, 1948

2,455,626

UNITED STATES PATENT OFFICE 2,455,626

MECHANICAL MOVEMENT FOR CONVERTING ROTARY MOTION INTO RECIPROCATING MOVEMENT

William A. Traut, Wauwatosa, Wis., assignor to Blackhawk Mfg. Co., Milwaukee, Wis., a corporation of Wisconsin Application June 24, 1944, Serial No. 541,946

8 Claims. (Cl. 74—45)

The present invention relates generally to improvements in the art of power transmission, and relates more specifically to improvements in the construction and operation of mechanical movements for converting rotary motion into reciprocating or vibratory movement of a definite pattern.

The primary object of this invention is to provide a new and useful mechanical movement which is simple and compact in construction, and which is moreover efficient in operation and flexible in its adaptations.

Many different types of mechanical movements for converting motion from one form into another, have heretofore been proposed and utilized for diverse purposes, and while some of these prior devices have proven relatively satisfactory for their intended purposes, there is still great need for a compact and durable motion and power transmitting device for converting high speed rotary motion into vibratory movement without excessive wear, heating and loss of power. Such a motion transmitter is especially useful for driving portable cutting and polishing tools, pumps, vibrators, and the like with the aid of a flexible shaft rotatable by an electric motor or from some other source of high speed rotary motion; and since it is desirable to manipulate portable implements of this type by hand, and to have the motion converter disposed as near to the work as possible, the mechanical movement should function with minimum vibration and as smoothly and quiet as possible.

It is therefore a more specific object of my present invention to provide an improved mechanical power and motion transmitting mechanism which embodies all of the above mentioned desirable features, and which is therefore especially adapted for use in connection with portable manually controlled implements or devices.

Another specific object of the invention is to provide a simple and unique rotary motion converter which is particularly adapted to transfer relatively high speed rotation from a rotary element, and to convert such rotation into reciprocating or vibratory movement at one or more points of utilization of the converted movement.

Still another specific object of this invention is to provide an extremely compact but powerful mechanical motion transmitter for converting rotary into reciprocating movement, and which may be readily constructed, assembled or dismantled, thus making all parts readily accessible for inspection and adjustment.

A further specific object of the present invention is to provide an improved mechanical movement adapted for diverse uses, and which may be manufactured at moderate cost and conveniently manipulated.

These and other specific objects and advantages of my present improvement will be apparent from the following detailed description.

A clear conception of the several features constituting the invention and of the mode of constructing and operating several types of mechanical movements embodying the improvement, may be had by referring to the drawings accompanying and forming a part of this specification wherein like reference characters have been employed to designate similar parts in the various views.

While the invention has been shown and described herein as being especially adapted for use in a mechanical movement for converting rotary into true reciprocating motion, it is not my desire or intent to thereby unnecessarily restrict the scope or utility of the improvement since the final motion need not be a truly rectilinear reciprocating motion but may follow diverse patterns.

Referring particularly to Figs. 1 to 4, inclusive, the relatively simple embodiment of my improved mechanical movement shown therein comprises in general, an elongated supporting member or body 18 having a bore 19 and a block 20 fixedly confined within the bore and provided with a spherical zone surface 21; an eccentric 22 journalled for rotation within the bore 19 in axial alinement with the block 20 and having an eccentrically revovable cylindrical socket 23 in one end, and a central tapered socket 24 in its opposite end; a reciprocable element or shoe 25 slidably but detachably mounted upon parallel rods 26 carried by the lower side portions of the body 18, and having therein a cylindrical pocket 27; a spherical motion transmitter or knuckle 28 seated against the surface 21 of the block 20 and being provided with rigid radiating arms 29, 30, of which the arm 29 has a spherical outer end 31 gyratable within the eccentric socket 23, while the other arm 30 has a similar spherical outer end 32 pivotally confined within the pocket 27; a source of rotary motion such as a drive shaft 33 journalled for rotation centrally within the body bore 19; a cone clutch member 34 splined for movement along the shaft 33 and being cooperable with the tapered socket 24 of the eccentric 22 to rotate the latter; a coil spring 35 normally tending to release the cone clutch member 34; and a lever 36 and bell-crank 37 both pivotally suspended from the body 18 and being manipulable to actuate the cone clutch.

Figure 1:
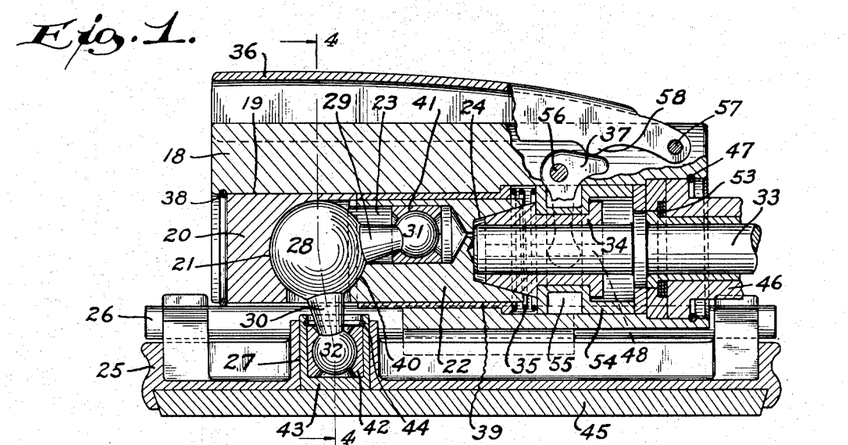
Fig. 1 is a central longitudinal vertical section through a simple embodiment of the invention applied to a portable reciprocable sanding or polishing shoe, showing the shoe at one extreme end of its reciprocatory motion.
Figure 2:
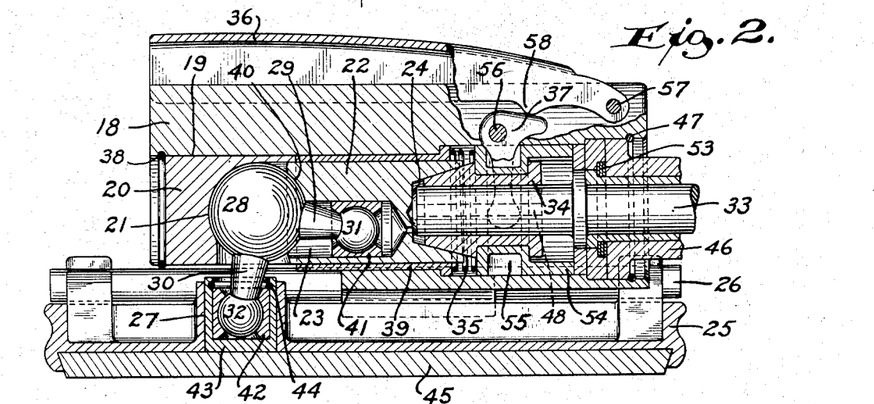
Fig. 2 is a similar section through the same assemblage but showing the shoe at the other extreme end of its reciprocation.

The main portable body 18 may be formed of suitable metal and is preferably shaped for convenient gripping by the hand of an operator as indicated in the drawings, and as shown in Figs. 1 and 2, the reaction block 20 may be fixedly confined within the bore 19 by means of a snap ring 38 coating with an annular groove in the bore. The eccentric 22 may be journalled directly within a bearing sleeve 39 secured within the body bore 19 in any suitable manner, and the eccentric 22 also has a spherical zone surface 40 adjacent to the socket 23 therein and coacting with the sphere of the knuckle 28. The arms 29, 30 of the motion transmitting knuckle 28 may be rigidly attached thereto or formed integral therewith, and the spherical arm end 31 coacts with a sectional bearing sleeve 41 which is freely rotatable and and slidable within the eccentric socket 23, while the other spherical arm end 32 coacts with another sectional bearing sleeve 42 which is confined within a cup-shaped element 43 by a snap ring 44, this cup-shaped element 43 being likewise freely slidable and rotatable within the shoe pocket 27. Universal motion transmitting connections are thus provided between the eccentric 22 and the arm 29, and between the other arm 30 of the knuckle 28 and the shoe 25; and while the arm end 31 is gyratable about the central axis of the bore 19, the movement of the other arm end 32 is confined to rectilinear oscillation in a plane parallel to the shoe guiding rods 26. The reciprocable element or shoe 25 may be provided with a face plate 45 to which sand paper or the like may be attached in any suitable manner, and this shoe may also be made detachable from the rods 26 in various ways.

Figure 3:
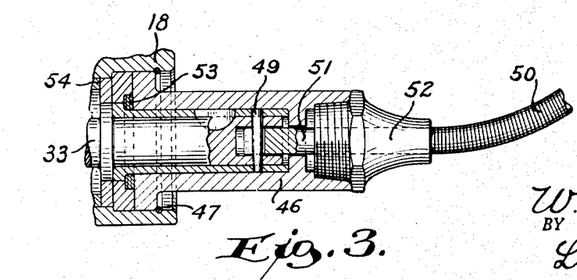
Fig. 3 is a central longitudinal section through a typical coupling for connecting the mechanical movement to a source of rotary motion.
Figure 4:
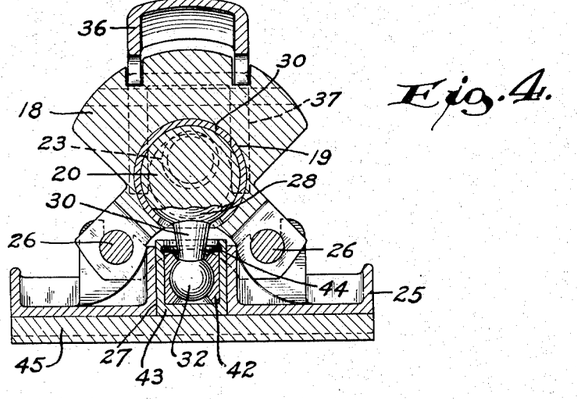
Fig. 4 is a transverse vertical section through the assemblage of Figs. 1 and 2, the section being taken along the line 4—4 of Fig. 1.

The main driving shaft 33 is journalled for rotation in axial alinement with the bore 19 of the body 18, in a bearing 46 which is normally held in place by another snap ring 47, and the cone clutch member 34 is slidably secured to the inner end of the shaft 33 by means of a spline 48, see Figs. 1, 2 and 3. The outer end of the shaft 33 may be bored as indicated in Fig. 3, and is provided with a pin 49 spanning the shaft bore. In order to make the improved assemblage freely movable in all directions as well as portable, a flexible driving shaft 50 which is rotatable at relatively high speed by means of an electric motor or the like, may be utilized, and the end of this flexible shaft 50 is provided with a bifurcated fitting 51 which is detachably cooperable with the pin 49 as shown. The flexible shaft end fitting 51 is rotatable within a cap 52 screw threaded into the outer end of the bearing 46 so that the shaft 50 may be readily detached or connected to the shaft 33; and a sealing device 53 may be interposed between the shaft 33 and the bearing 46 in order to permit suitable lubricant to be confined within the body bore 19. The clutch member 34 is rotatable within a medially grooved sleeve 54 which is slidable within the enlarged end of the bore 19, and the compression spring 35 is interposed between the fixed bearing sleeve 39 and the adjacent end of the sleeve 54 and tends to constantly disconnect the cone clutch.

The medial portion of the sleeve 54 is provided with an annular groove 55 with which the depending arms of the bell-crank 37 coact, and this bell-crank 37 is swingably suspended from a pivot pin 56 secured to the body 18. The manually operable lever 36 is also swingably suspended from the body 18 by another pivot pin 57, and has a pair of medial projections 58 which are cooperable with the laterally extending arm of the bell-crank 37, so that pressure applied to the lever 36 by the palm of the operator's hand will cause the bell-crank 37 to compress the spring 35 and drive the conical clutch member 34 into the tapered socket 24, thus frictionally connecting the eccentric 22 to the constantly rotating power or drive shaft 33. However, when the pressure on the lever 36 is released, the spring 35 will become quickly effective to release the friction cone clutch, and the power and motion transmission is thus immediately interrupted.

During normal operation and use of the improved mechanical movement just described, the face plate 45 of the shoe 25 may be provided with sand paper or the like, and the main shaft 33 may be rotated continuously from any suitable source of power such as an electric motor, through the flexible shaft 50. The operator may then grip the body 18 and in order to produce rapid reciprocation of the shoe 25, it is only necessary for the operator to apply pressure to the lever 36 with the palm of his hand. Due to the flexibility of the shaft 50, the improved unit may obviously be placed in any desired position and moved from place to place, and when the lever 36 is pressed toward the body 18, the bell-crank 37 will move the cone clutch member 34 into the tapered socket 24 and will produce rapid rotation of the eccentric 22 about the central longitudinal axis of the bore 19. The knuckle arm 29 will then be gyrated or revolved about a conical path having its apex at the center of the spherical knuckle 28, and since the arm 30 is formed rigid with this knuckle, this arm 30 will tend to wobble. The shoe 25 is however guided for rectilinear reciprocation by the guide rods 26 so that the spherical end 32 of the arm 30 cannot move laterally and can only move in a plane parallel to the rods 26. The shoe 25 is thus rapidly reciprocated during revolution of the arm 29 and its spherical end 31, and the knuckle 28 will remain seated against the surface 21 during such conversion of the rotary motion of the shaft 33 into reciprocating motion of the shoe 25. Immediately upon release of the pressure on the lever 36, the compression spring 35 will function to release the driving connection, and the motion of the eccentric 22 and of the shoe will then cease. It will thus be noted that the rotary motion of the shaft 33 is effectively and continuously converted into reciprocating motion of the shoe 25 whenever the clutch is thrown in, and by undulating the guide shafts 26, any desired pattern other than true rectilinear reciprocation, may be likewise produced.

Figure 5:
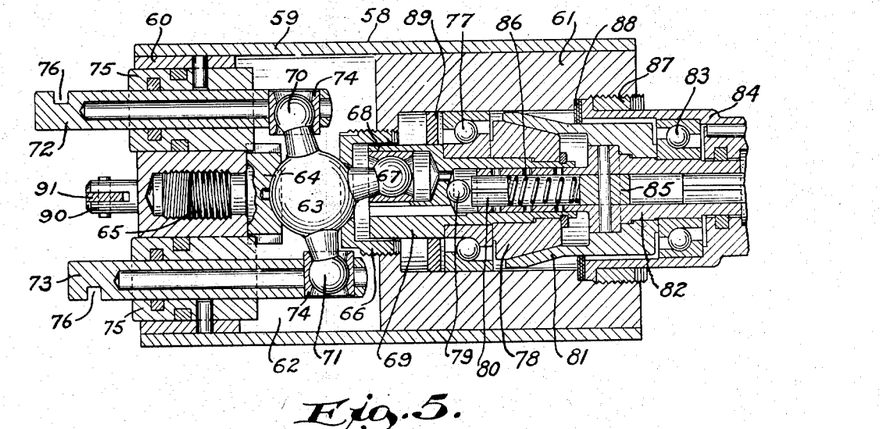
Fig. 5 is a central longitudinal section through a similar device embodying the invention, but showing two take-offs for the final reciprocatory motion.

Referring more especially to Fig. 5 of the drawing, the improved mechanical movement shown therein is quite similar to that just described, except that the driving shaft and eccentric have been provided with anti-friction or ball bearings and the motion transmitting knuckle has been provided with an additional radiating arm for simultaneously reciprocating two working elements or members instead of one. In this specific modification of the invention, the body 58 comprises an outer tubular casing 59 having concentric but axially separated end members 60, 61 secured therein to provide a sealed intermediate chamber 62. The modified motion converter or knuckle 63 is confined centrally within the chamber 62 by a seating element 64 which is adjustably secured to the end member 60 by means of screw threads 65, and by another element 66 screw threaded into the member 61 and coacting with the opposite side of the spherical body of the knuckle 63. The knuckle 63 has one radial arm 67 the outer spherical end of which coacts with the socket 68 of a rotary eccentric 69, and also has two alined oppositely located arms 70, 71 disposed at right angles to the arm 67 and the outer spherical ends of which coact with transverse cylindrical openings in two parallel reciprocable plungers 72, 73 respectively through bearing sleeves 74. The plungers 72, 73 are slidably confined within bushings 75 which are secured to the fixed end member 60, and the outer end of each plunger 72, 73 is provided with a notch 76 for effecting attachment thereof to a pump piston or other device which it is desired to reciprocate.

The eccentric 69 is journalled for free rotation concentrically of the knuckle 63, within an antifriction or ball bearing 77 and has a tapered or conical clutch member 78 rigidly attached to its end remote from the eccentric socket 68, and this end of the eccentric 69 is also provided with a central bore having therein a ball 79 and a plunger 80. Another clutch member 81 having a tapered socket formed to frictionally engage the conical portion of the member 78, is mounted upon a driving shaft 82 which is journalled for rotation within another anti-friction or ball bearing 83 carried within a tubular casing 84 secured to the body member 61; and the inner end of the drive shaft 82 is slidably confined within the central end bore of the eccentric 69 and is provided with a plug 85 coacting with one end of a compression spring 86 the opposite end of which bears against the plunger 80. This spring 86 constantly tends to separate the friction clutch members 78, 81, and the ball bearings 77, 83 are of the type which will effectively resist the end thrust induced by the spring plus the force resulting from the operator's hand engaging the clutch lever. The casing 84 is detachably secured to the member 61 by means of a ring nut 87 and is provided with a seal 88, and the drive shaft 82 may be detachably connected to a source of rotary motion in any desired manner. Since the drive shaft 82 is fixed against axial displacement, the eccentric 69 and clutch member 78 must be shifted axially in order to effect actuation of the cone clutch, and such shifting of these parts is made possible by an annular lever or shifting ring 89 loosely surrounding the eccentric 69 and coacting with the inner extremity of a push rod 90 the outer end of which is movable by means of a lever 91 coacting with an adjustable fulcrum 93 as shown more in detail in Figs. 6 and 7. The shifting lever ring 89 is cooperable with a fixed fulcrum pin 92 and with the eccentric 69 at diametrically opposite places, so that swinging of the ring 89 about the pin 92 will cause the clutch member 78 to engage the member 81.

Figure 7:
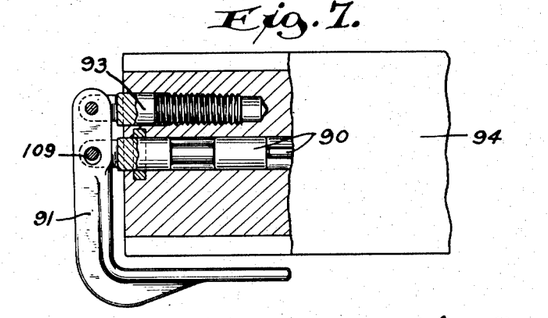
Fig. 7 is a transverse longitudinal section taken through the manipulating mechanism of the assemblage of Fig. 6.

During normal operation of the modified assemblage shown in Figs. 5 and 7, the shaft 82 may be rotated at high speed in any suitable manner, and the spring 86 will normally function to release the cone clutch members 78, 81 so that the mechanical movement will not be functioning. However, by pressing on the lever 91, the eccentric 69 and cone clutch member 78 may be shifted so as to cause the latter to engage the clutch member 81, thereby imparting rapid rotation to the eccentric 69. The eccentric socket 68 will then revolve and will gyrate the arm 67 of the knuckle 63, causing this arm to revolve about a conical path having its apex at the center of the main sphere. By virtue of the fact that the diametrically opposite radiating arms 70, 71 are prevented from moving out of the common plane of the axes of the plungers 72, 73, these arms 70, 71 will produce rapid reciprocation of the plungers 72, 73 in opposite directions. By attaching the plungers 72, 73 to devices such as pump plungers, these devices may be rapidly and continuously reciprocated whenever the cone clutch is thrown in, and the ball bearings 77, 83 insure smooth functioning of the mechanical movement without permitting excessive heating. These bearings as well as other parts of the assemblage may be effectively lubricated by confining suitable lubricant within the chamber 62, and the members 64, 66 which coact with the spherical body of the knuckle 63 may be readily adjusted so as to eliminate excessive play. Upon release of the lever 91, the spring 86 will obviously become quickly effective to disconnect the cone clutch, and the ball 79 and plunger 80 will permit free rotation of the drive shaft 82 whenever the clutch is thus disconnected.

Referring especially to Figs. 6 to 9 inclusive, the modified portable motion converting and transmitting mechanism shown therein is of the anti-friction bearing type shown in Fig. 5, but embodies additional refinements such as improved latches for readily connecting and disconnecting the rotary drive shaft and the reciprocated devices. In this assemblage the body 94 is formed of a single piece of metal having an internal chamber 95 which is normally sealed by a lower plate 96 and with which a motion converter or knuckle 28 is confined by means of the seating members 64, 66 which are accessible for convenient adjustment upon removal of the plate 96. The eccentric 69 of this embodiment has an eccentric socket 68 which coacts with the spherical end of one radial arm 29 through a split sleeve 41, and also has a cone clutch member 78 rigidly attached thereto as in Fig. 5, these elements likewise being mounted for free rotation in a ball-bearing 77 carried by the body 94. The spherical end of the other radial arm 30 of the knuckle 28 coacts with an opening in the inner end of a reciprocable rod or plunger 73 through a bushing 74, and the outer end of the plunger rod 73 has a lateral notch 76 while the medial portion thereof is slidable within a fixed bushing 75 secured to the body 94.

Figures 6, 8, 9:
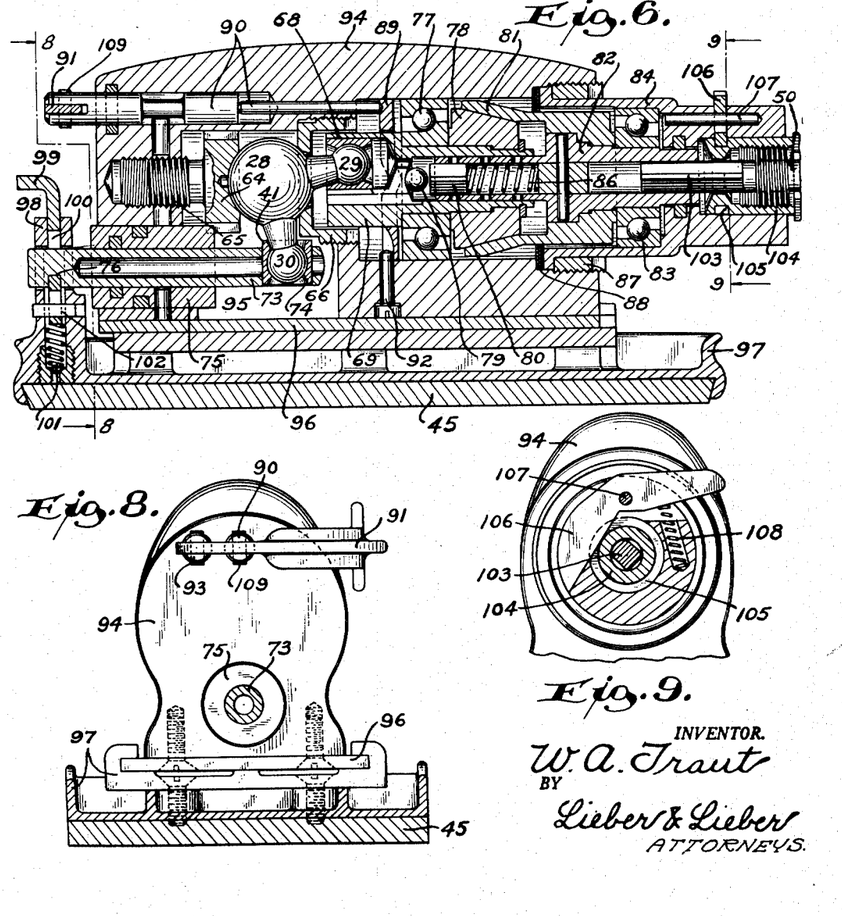
Fig. 6 is a central longitudinal vertical section through another embodiment of the invention likewise applied to a portable reciprocable sanding shoe or the like, and embodying anti-friction bearings for the various parts.
Fig. 8 is an end view and transverse vertical section taken through the assemblage of Fig. 6 along the line 8—8.
Fig. 9 is a transverse vertical section through the assemblage of Fig. 6 taken along the line 9—9, and showing the latch for releasing the improved mechanisms from the flexible drive shaft.

As shown in Figs. 6 and 8, a reciprocable shoe 97 is slidably mounted upon the opposite side edges of the lower plate 96 and has a lower plate 45 for facilitating attachment of sand paper or the like thereto, and this shoe 97 is reciprocable longitudinally of the body 94 and parallel to the plunger rod 73. The end of the shoe 97 nearest the outer end of the rod 73, is provided with upright guides 98 within which a latch 99 is vertically slidable, and this latch 99 has an opening 100 of larger diameter than that of the rod 73, the lower portion of which is adapted to engage the notch 76, see Fig. 6. The latch 99 is urged upwardly by means of a coil spring 101 and is prevented from leaving the guides 98 by a stop pin 102. In order to drivingly connect the shoe 97 to the rod 73, it is only necessary to press the latch 99 so as to permit the rod 73 to enter the opening 100 and to thereafter slide the latch along the rod so as to permit the parts to interlock as in Fig. 6, and release of the shoe 97 may be just as readily effected by merely pressing the latch 99 downwardly against the spring 101 and by subsequently withdrawing the latch from the rod end and the shoe from the plate 96.

The hollow drive shaft 82 of the assemblage shown in Figs. 6 to 9, inclusive, is similar to that of Fig. 5, and is provided with an internally tapered clutch member 81 which is frictionally cooperable with the cone member 78. The clutch members 78, 81 are normally disengaged by a spring 86, and the shaft 82 is mounted for free rotation in a ball bearing 83 carried by the removable casing 84, and has a polygonal central socket which is slidably engaged by a similarly polygonal plug firmly secured to the end of a flexible driving shaft 50 similar to that shown in Fig. 3 and which is adapted to be continuously rotated at high speed from any suitable source of power. The armor of the flexible shaft 50 is provided with a special end fitting 104 as shown in Figs. 6 and 9, within which the shaft 50 is freely-rotatable and which is swivelled in the casing 84, and the fitting 104 has a peripheral annular groove 105 therein. A latch 106 which is swingably suspended from the casing 84 by means of a pivot pin 107, is constantly urged toward latching position by a spring 108, and when this latch engages the fitting groove 105 as in Fig. 9, the drive shaft 82 is drivingly connected to the power or driving shaft 50 and the plug 103 is held within the drive shaft socket. These parts may however be quickly disconnected by merely pressing on the latch 106 so as to compress the spring 108 and by subsequently sliding the fitting 104 out of the socket.

The eccentric 69 of the modified structure of Figs. 6 and 7 is provided with a clutch shifting plate 89 which normally engages a stop pin 92 as in Fig. 5, but which may be shifted to engage the cone clutch members 78, 81, with the aid of a composite plunger rod 90 and a manually operable bent lever 91 as shown in detail in Figs. 6, 7 and 8. The plunger rod 90 is slidable within a bore in the body 94, and the bent lever 91 is pivotally mounted upon an adjustable fulcrum 93 which is screw threaded for adjustment within the body 94, and a loose pin connection 109 is provided between the rod 90 and the lever 91 so as to prevent binding. The lever 91 is bent so as to permit convenient manipulation thereof by the thumb of the operator while gripping the body 94, and the plunger rod 90 and bushing 75 are preferably provided with lubricant seal rings as shown.

The normal operation of the modified embodiment of the invention shown in Figs. 6 to 9 inclusive, is substantially the same as those of Figs. 1 and 5, and when the lever 91 is released, the cone clutch will be disconnected by the spring 86 and the drive shaft 82 will rotate idly. However, when the lever 91 is pressed toward the body 94, the plunger rod 90 will press against the disk or plate 89, thereby compressing the spring 86 and connecting the cone clutch, thus causing the eccentric 69 to rotate and to gyrate the knuckle arm 29 about a conical path. This gyratory motion is converted by the knuckle 28 into oscillating motion of the other knuckle arm 30 which is confined to oscillation in the plane of the rod 73 by the guide bushing 75. The rod 73 is thus reciprocated and its reciprocating motion is transmitted to the shoe 97 through the latch 99 in an obvious manner. The shoe 97 may be quickly and conveniently removed by merely manipulating the latch 99, and the entire assemblage may likewise be disconnected from the power source by manipulating the other latch 106.

Referring particularly to Figs. 10 to 13 inclusive, the further modified and improved embodiment of the invention shown therein utilizes a disk type of clutch instead of a cone clutch, and also incorporates additional anti-friction bearings and guiding means for insuring smooth and efficient operation of the mechanism. In this improved unit, the elongated main frame or body 110 is provided with a chamber 111 at one end within which a seating block 112 for the knuckle 28 is adjustably confined by shims 113 and an end closure cap 114; and is also provided with a bore 115 at its opposite end for removably confining the eccentric 116, the drive shaft 117 and a disk clutch. The motion converter or knuckle 28 is disposed between the block 112 and a plate 118, and the spherical outer end of the knuckle arm 29 coacts with an eccentric socket formed in the eccentric 116, through a special anti-friction or ball bearing assemblage comprising separable ball races 119, 120 normally held together by a snap ring 121, and annular series of balls 122 interposed between the races 119, 120 and the spherical end of the gyratory arm 29, see Figs. 10 and 11. The adjacent portion of the eccentric 116 is mounted for free rotation in a roller bearing 123, and the opposite reduced end of this eccentric is confined within a central bore of the drive shaft 117 while the medial portion thereof has a shifting plate 124 secured thereto.

Figure 10:
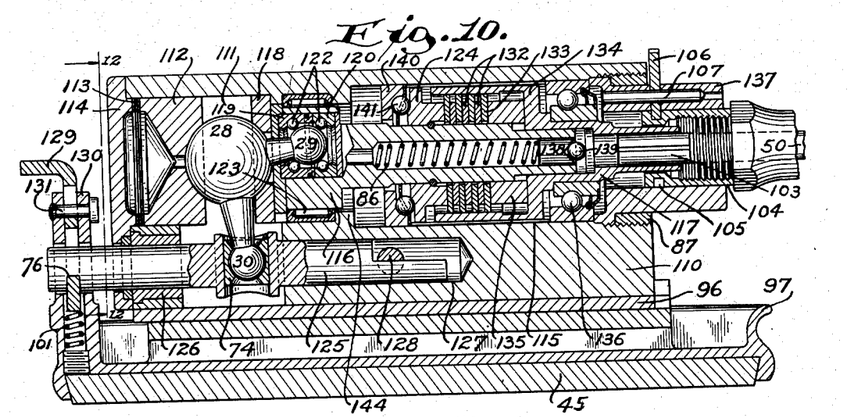
Fig. 10 is a central longitudinal vertical section through still another embodiment of the invention also applied to a sanding shoe, and wherein a multiple disk clutch is employed instead of a cone clutch as in Figs. 1, 2 and 6, and also including various other improvements in its details of construction.

The oscillatory arm 30 of the knuckle 28 coacts with a cylindrical through opening in a modified reciprocable motion transferring rod 125, through a split bushing 74, and the rod 125 is guided for reciprocation within a bushing 126 and a bore 127 associated with the body 110. In order to prevent possible rotation of this rod 125 about its own axis, the end thereof which is slidable in the bore 127 is made semi-circular as shown in Fig. 10, and a semi-circular pin 128 is disposed across the bore 127 with its flat face engaging the flattened rod end. The outer end of the rod 125 is provided with a notch 76 adapted for coaction with a releasable latch 129 which is similar to the latch 99 and is slidable in guides 130 formed on the reciprocable shoe 97, by means of a spring 101, and is also guided by a pin 131, and this latch 129 may be urged toward released position by the hand of the operator. The reciprocable shoe 97 may be slidably and removably suspended from the lower closure plate 96, and may also be provided with a sand paper attaching plate 45 as previously explained.

The friction disk clutch which is confined within the body bore 115 comprises a series of parallel plates 132 which are splined to the eccentric 116 and another series of intervening parallel plates 133 which are likewise splined within a cup-shaped extension 134 of the drive shaft 117, and these plates 132, 133 are compressible between the collar or plate 124 carried by the eccentric 116 and another collar 135 coacting with the shaft 117 within the extension 134. The drive shaft 117 is mounted for free rotation within and is prevented from shifting axially by a ball bearing 136 carried by the body 110; and is detachably drivingly connectible to a driving plug 103 firmly secured to the end of a flexible shaft 50, by means of a latch 106 engaging the groove 105 of a swivel fitting 104, as shown in Fig. 9. This latch 106 is pivotally suspended from a modified tubular end casing 137 by means of a pivot pin 107, and the casing 137 is detachably secured to the body 110 by a ring nut 87.

Figures 11, 12, 13, 14, 15, 16:
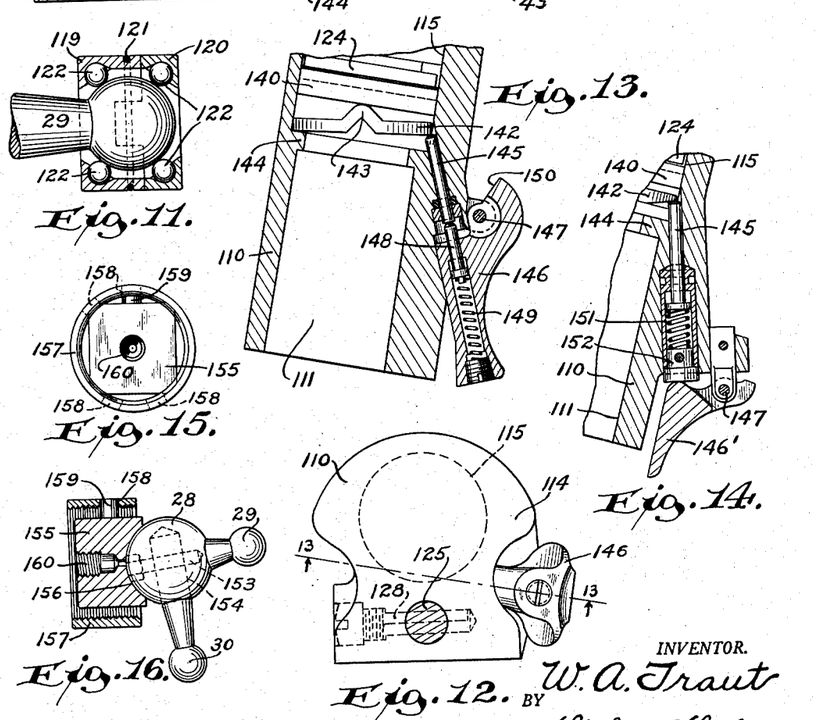
Fig. 11 is an enlarged central section through an improved anti-friction bearing for one of the knuckle arms.
Fig. 12 is a transverse section taken through the improved assemblage of Fig. 10, along the line 12—12 thereof, the sled shoe having been omitted.
Fig. 13 is a fragmentary transverse section also taken through the improved assemblage of Figs. 10 and 12, along the line 13—13 of Fig. 12, and showing one improved type of clutch manipulating mechanism.
Fig. 14 is a similar section showing another improved type of manipulating mechanism.
Fig. 15 is an end view of an improved adjusting assemblage for the knuckle seat.
Fig. 16 is a central vertical section through the assemblage of Fig. 15.

A helical compression spring 86 disposed within a central bore of the eccentric 116, and which presses against a plunger 138 and ball 139 coacting with the end of the drive shaft 117, serves to normally release the disk clutch, but this clutch may be engaged by means of a disk 140 coacting with the plate 124 through an annular series of anti-friction balls 141. As shown in Fig. 13, a lever ring or plate 142 similar to the ring 89 of Figs. 5 and 6, is mounted within the bore 115 and this annular plate loosely surrounds the eccentric 116 and has its medial portion provided with diametrically opposite projections 143 which bear against the plate 140. The edge portion of the plate 142 on one side of the projections 143 is fulcrumed against an inner flange 144 of the body 110, and the diametrically opposite edge portion of the plate is adapted to be engaged by a pin 145 which is slidable by means of a lever 146 swingably suspended from the lower side portion of the body 110 by a pivot pin 147. The lever 146 carries a plunger 148 pressed outwardly by a spring 149 and the outer end of which is directly engageable with the adjacent end of the pin 145 as shown in Fig. 13. When the lever 146 has been swung by the thumb of the operator, in contact with the body 110 as shown, the spring 149 will force the pin 145 against the lever plate 142 and this plate 142 will force the disks 132, 133 of the friction clutch into intimate contact with each other thereby imparting rotary motion from the drive shaft 117 to the eccentric 116; but when the lever 146 is released, the spring 86 will quickly separate the disks 132, 133 and the spring 149 will cooperate to swing the lever 146 outwardly away from the body 110 and against a stop 150, thus moving the parts into inactive position.

A modified lever assemblage for actuating the disk friction clutch, is shown in Fig. 14, wherein the lever plate 142 is likewise swingable to engage the clutch disks 132, 133, by means of a slidable spring pressed pin 145. In this modification the outer end of the pin 145 is engaged by a compression spring 151, and the thumb lever 146' which is swingably suspended from the body 110 by a pivot pin 147, engages a button block 152 secured to the outer end of the spring 151. The operation of this modification is the same as in Fig. 13, and the lever 146' may be omitted so as to permit direct application of the thumb pressure to the button block 152, if so desired.

During normal operation of the improved mechanism specifically shown in Figs. 10 to 14 inclusive, the shoe 97 may be drivingly connected to the outer end of the guide rod 125 with the aid of the latch 129, and the end plug 103 of the driving shaft 50 may likewise be drivingly connected to the shaft 117 and thus maintained with the aid of the latch 106 coacting with the swivel fitting 104. The constantly rotating drive shaft 117 may then be quickly connected to the eccentric 116 by manipulating the thumb lever 146 so as to engage the clutch disks 132, 133, and when the eccentric 116 is rotating it will again gyrate the knuckle arm 29 about a conical path, and will simultaneously oscillate the other knuckle arm 30. Since the rod 125 is positively confined to reciprocating motion, the oscillating motion of the arm 30 of the knuckle 28 will produce reciprocation of the rod 125, and the half pin 128 will prevent possible rotation of the rod 125 about its own axis The ball bearing assemblage shown in Fig. 11 and which is applied to the gyrating arm 29 of the knuckle 28, will reduce the friction and will eliminate excessive heating of the coacting parts, and the roller bearing 123 and ball bearing 136 will further reduce the friction losses. The use of the disk clutch instead of a cone clutch as in the previously described embodiments of the invention, also eliminates possible slippage and possible misalinement, and the provision of the lever 146 for manipulating this clutch also facilitates normal operation of the unit.

It may become desirable to adjust the seating and the confining pressure on the motion converter or knuckle 28, either during initial setting or after the assemblage has been operated for some time and the parts have become worn, and such adjustment may be accomplished either by the use of shims 113 as shown in Fig. 10, or with an improved mechanism such as shown in Figs. 15 and 16. The knuckle 28 of this mechanism has the arm 29 thereof formed integral and concentric with the main sphere, while the other arm 30 is rigidly attached to the main sphere by means of a pin 153 pushed into the knuckle 28 in axial alinement with the arm 29 and piercing an integral shank 154 of the arm 30. The main spherical body of the knuckle 28 coacts with a polygonal reaction block or seating member 155 having a spherical seating surface 156, and the corners of which are screw threaded for adjustment within an internally threaded ring 157, and this ring 157 is adapted to be fastened to the main body of any of the assemblages in any suitable manner as with a snap ring 38 in order to prevent axial movement of the ring 157. The ring 157 is provided with four through openings or holes 158 disposed in upper and lower pairs as viewed in Fig. 15, and a pin 159 is insertable in any one of these holes 158 whenever a side face of the member 155 is disposed perpendicular to the axis of the pin receiving hole. The axes of the holes 158 of each pair are disposed forty-five degrees apart, and the nearest holes 158 of the two pairs have their axes disposed one hundred twelve and one-half degrees apart, so that the locking pin 159 may be dropped in the various holes 158 and caused to cooperate with the four sides of the member 155 so as to provide sixteen different positions of adjustment each twenty-two and one-half degrees apart measured circumferentially. The member 155 may be provided with a screw threaded central socket 160 for effecting removal thereof, and this improved assemblage obviously provides means for quickly and accurately adjusting the reaction block or member 155 in order to properly position the knuckle 28.

From the foregoing detailed description it will be apparent that my present invention provides a simple, compact and highly efficient mechanism for converting high speed rotary motion into reciprocating motion of a shoe or other device. The spherical knuckle in each case is seated for universal movement in a reaction block or member, and is provided with a gyratory arm 29 and with one or more oscillatory arms all of which radiate from the main spherical body of the knuckle. The outer ends of these radiating arms are in each case engaged by the adjacent parts so as to provide for universal motion, and while the arm 29 is always gyrated in a conical path, the other radiating arms of the knuckle 28 may be definitely guided so as to oscillate in paths having various predetermined characteristics, not necessarily rectilinear. Either a cone or a disk clutch or any other type of connection may be utilized to impart motion to the actuating eccentric which gyrates the arm 29, and due to its compactness, the motion converting mechanism may be readily confined within a small portable manually manipulable body upon which the reciprocating shoe or other device may be properly guided, and which is conveniently detachable from the power source and is freely movable without undue effort. The use of anti-friction bearings for the drive shaft, eccentric and other parts, will reduce friction losses to a minimum, and will also eliminate excessive heating, and the relatively small and delicate parts of the mechanism may be confined within lubricant for proper lubrication and are also thoroughly protected against damage due to reckless use of the assemblage. By constructing the lower plate 96 of heat insulating material, heat resulting from the sliding of the shoe 45 may also be prevented from reaching the knuckle 28, thus further preventing possible over-heating. The various parts of the mechanism while being thus safely confined during normal operation, are still readily accessible for inspection, and may be conveniently assembled or dismantled, and by utilizing a flexible driving shaft 50 associated with the power source and detachably connected to the motion converting mechanism, the improved unit may obviously be manipulated and freely disposed in any desired position remote from the actual source of power without undue effort. It is noteworthy that the outwardly projecting arms of the knuckle 28, may extend in any desired direction away from the center of the main sphere, and that there may be any number of these motion transmitting arms provided. The improved assemblage has proven highly satisfactory and successful in actual operation, especially as applied to saws and sanding mechanisms, and functions without undesirably vibrating the main body which is normally gripped by the hand of an operator.

It should be understood that it is not desired to limit this invention to the exact details of construction or to the precise mode of use, herein shown and described, for various modifications within the scope of the appended claims may occur to persons skilled in the art.

I claim:

1. In a mechanism for converting rotary motion into reciprocating movement, a body having a bore, a reaction block having a spherical zone socket disposed coaxial with said bore, a knuckle having a pivot sphere oscillatable within said socket and being provided with a pair of rigid arms each having a spherical swinging end, one of said arms projecting laterally away from said bore and the other projecting longitudinally into said bore and away from said block, means for positively confining said laterally projecting arm to swinging motion in a plane, and an eccentric confined within said bore and rotatable about the bore axis and coacting with the other of said arms to gyrate the same.

2. In a mechanism for converting rotary motion into reciprocating movement, a body having a bore, a reaction block having a spherical zone socket disposed coaxial with said bore, a knuckle having a pivot sphere oscillatable within said socket and being provided with a pair of rigid arms each having a spherical swinging end, one of said arms projecting laterally away from said bore and the other projecting longitudinally into said bore and away from said block, means for positively confining said laterally projecting arm to swinging motion in a plane, an eccentric confined within said bore and rotatable about the bore axis and coacting with the other of said arms to gyrate the same, and a clutch also confined within said bore coaxial with said eccentric and said socket for detachably connecting the eccentric with a source of rotary motion.

3. In a mechanism for converting rotary motion into reciprocating movement, a body having a bore extending therethrough, a reaction block confined in one end of said bore and having a spherical zone socket facing and disposed coaxial with said bore, a knuckle having a pivot sphere oscillatable within said socket and being provided with a pair of rigid radial arms each having a spherical swinging end, one of said arms projecting laterally away from the bore axis and the other extending longitudinally of said axis and away from said socket, means for positively confining said laterally projecting arm to swinging motion in a plane containing said bore axis, and an eccentric journalled in said bore for rotation about the bore axis and coacting with the other of said arms to gyrate the same.

4. In a mechanism for converting rotary motion into reciprocating movement, a body having a bore extending therethrough, a reaction block confined in one end of said bore and having a spherical zone socket facing and disposed coaxial with said bore, a knuckle having a pivot sphere oscillatable within said socket and being provided with a pair of rigid radial arms each having a spherical swinging end, one of said arms projecting laterally away from said socket, means for positively confining said laterally projecting arm to swinging motion in a plane containing said bore axis, an eccentric journalled in said bore for rotation about the bore axis and coacting with the other of said arms to gyrate the same, and a clutch confined in the opposite end of said bore coaxial with said eccentric and said socket for detachably connecting the eccentric with a source of rotary motion.

5. In a mechanism for converting rotary motion into reciprocating movement, a body having a bore extending therethrough, a reaction block confined in one end of said bore and having a spherical zone socket facing and disposed coaxial with said bore, a knuckle having a pivot sphere oscillatable within said socket and being provided with a pair of rigid radial arms each having a spherical swinging end, one of said arms projecting laterally away from the bore axis and the other extending longitudinally of said axis and away from said socket, means for positively confining said laterally projecting arm to swinging motion in a plane containing said bore axis, an eccentric journalled in said bore for rotation about the bore axis and coacting with the other of said arms to gyrate the same, and a clutch confined in the opposite end of said bore coaxial with said eccentric and said socket for detachably connecting the eccentric with a source of rotary motion, said block and said clutch being removable from said bore through the respective adjacent bore ends.

6. In a mechanism for converting rotary motion into reciprocating movement, a body having a bore extending therethrough, a reaction block confined in one end of said bore and having a spherical zone socket facing and disposed coaxial with said bore, a knuckle having a pivot sphere oscillatable within said socket and being provided with a pair of rigid radial arms each having a spherical swinging end, one of said arms projecting laterally away from the bore axis and the other extending longitudinally of said axis and away from said socket, means for positively confining said laterally projecting arm to swinging motion in a plane containing said bore axis, and an eccentric journalled in said bore for rotation about the bore axis and coacting with the other of said arms to gyrate the same, said eccentric bearing directly against the pivot sphere of said knuckle remote from said block socket.

7. In a mechanism for converting rotary motion into reciprocating movement, a body having a bore extending therethrough, a reaction block confined in one end of said bore and having a spherical zone socket facing and disposed coaxial with said bore, a knuckle having a pivot sphere oscillatable within said socket and being provided with a pair of rigid radial arms each having a spherical swinging end, one of said arms projecting laterally away from the bore axis and the other extending longitudinally of said axis and away from said socket, means for effecting adjustment of said block longitudinally of said bore to insure surface coaction between said pivot sphere and said socket, means for positively confining said laterally projecting arm to swinging motion in a plane containing said bore axis, and an eccentric journalled in said bore for rotation about the bore axis and coacting with the other of said arms to gyrate the same.

8. In a mechanism for converting rotary motion into reciprocating movement, a body having a bore extending therethrough, a reaction block confined in one end of said bore and having a spherical zone socket facing and disposed coaxial with said bore, a knuckle having a pivot sphere oscillatable within said socket and being provided with a pair of rigid radial arms each having a spherical swinging end, one of said arms projecting laterally away from the bore axis and the other extending longitudinally of said axis and away from said socket, means for positively confining said laterally projecting arm to swinging motion in a plane containing said bore axis, an eccentric journalled in said bore for rotation about the bore axis and coacting with the other of said arms to gyrate the same, a clutch confined in the opposite end of said bore coaxial with said eccentric and said socket for detachably connecting the eccentric with a source of rotary motion, and means at the side of said bore opposite to that pierced by said laterally projecting arm for effecting actuation of said clutch.

WILLIAM A. TRAUT.

REFERENCES CITED

The following references are of record in the file of this patent:

UNITED STATES PATENTS

| Number | Name | Date |
|---|---|---|
| 423,120 | Brown | Mar. 11, 1890 |
| 743,147 | Church | Nov. 3, 1903 |
| 1,210,649 | Holley et al. | Jan. 2, 1917 |
| 1,302,836 | Noonan | May 6, 1919 |
| 2,100,188 | Harsmann | Nov. 23, 1937 |